United States Patent [19]

Leroy et al.

[11] Patent Number: 4,716,008

[45] Date of Patent: Dec. 29, 1987

[54] DEVICE FOR CONTROL OF THE CORE OF A NUCLEAR REACTOR

[75] Inventors: Claude Leroy, Lardy; Jean-Paul Millot, Elancourt; Guy Desfontaines, Puteaux, all of France

[73] Assignee: Framatome & Cie, Courbevoie, France

[21] Appl. No.: 696,369

[22] Filed: Jan. 30, 1985

[30] Foreign Application Priority Data

Jan. 30, 1984 [FR] France .................. 84 01360

[51] Int. Cl.⁴ ................................. G21C 7/12
[52] U.S. Cl. ..................... 376/237; 376/209;
  376/228; 376/230; 376/235
[58] Field of Search ........... 376/209, 219, 224, 228, 376/230, 235, 236, 237, 238, 242

[56] References Cited

U.S. PATENT DOCUMENTS 3,940,311  2/1976  Frisch et al. .
4,544,521  10/1985  Millot et al. .................. 376/235

FOREIGN PATENT DOCUMENTS 108019  7/1982  European Pat. Off. .
108020  7/1982  European Pat. Off. .
2232820  1/1975  France .

Primary Examiner—Deborah L. Kyle
Assistant Examiner—Richard L. Klein
Attorney, Agent, or Firm—Pollock, Vande Sande & Priddy

[57] ABSTRACT

A control device for a PWR includes a plurality of clusters arranged for insertion into and removal from the core and each having a plurality of rods connected to a common carrier vertically slidable in a stationary guide structure and connectable to a drive shaft. First clusters contain neutron absorbing material and are each individually associated with electromagnetic actuation means for adjusting the amount of insertion of the associated one of the first clusters. Second clusters contain a different material and are each individually associated with hydraulic actuation means controllable to cause upward and downward movement. A set of one first cluster and one second cluster is associated with some of said fuel assemblies, with the drive shafts of the two clusters in each set being arranged symmetrically with respect to the axis of a single stationary structure located above the associated fuel assembly and arranged for authorizing mutually independent movement of the first and second clusters.

8 Claims, 12 Drawing Figures

DEVICE FOR CONTROL OF THE CORE OF A NUCLEAR REACTOR

BACKGROUND OF THE INVENTION

The invention relates to a device for control of the core of a nuclear reactor by means of clusters with diverse functions. such as control clusters and spectral shift clusters.

A method which provides for better utilization of nuclear fuel and reduced uranium fuel costs involves shifting the neutron energy spectrum in the core of the reactor from "soft" to "hard" during the early phase of the operating cycle or core life. For this purpose, it has been proposed, for example, during the first part of the reactor operating cycle, to introduce into the core the rod clusters of material which preferentially absorbs slow neutrons (typically fertile material which can be converted into fissile material under the action of the slow neutrons, such as depleted uranium). A hardening of the neutron spectrum is thus produced both by the reduction in the volume of the moderator in the core and by absorption of low-energy neutrons. In a second part of the reactor operating cycle, the rod clusters which exhibit non-fission slow neutron absorption are withdrawn from the reactor core and the fissile material in the nuclear fuel contained in the assemblies during the first phase is consumed. Reference may be made, for example, to European Patent Application Nos. 108,019 and 108,020.

In such reactors, joint use is then made of clusters of neutron-absorbing rods, which may be inserted to a greater or lesser extent into the assemblies forming the reactor core to control the latter, and of spectral shift clusters which are completely inserted into the fuel assemblies forming the reactor core during the first part of the operating cycle. In particular, the control clusters and the spectral shift clusters may be associated with the same reactor core assemblies, with a common motorized drive.

European Patent Application No. 111,435 describes a device incorporating control clusters and spectral shift clusters which are coaxial, each with a rotational symmetry of distribution of the rods in the fuel assembly with which they are associated. Movement of the clusters is produced by two coaxial control shafts rectilinearly moveable along a fluid-tight enclosure and equipped with means for locking the shafts in a plurality of positions. Each shaft connected to a control cluster is actuated by conventional means comprising electromagnetic coils and pawls. On the other hand, each shaft for controlling a spectral shift cluster, which is mounted coaxially inside the shaft of the control cluster, comprises a piston slidably accomodated in the control shaft and upwardly moved upon opening of a valve for pressure/release in the upper part of the fluid tight enclosure along which the control shafts are movable. In its uppermost position, the spectral shift shaft can be coupled to the control cluster shaft by fingers which engage in a groove in the spectral shift shaft.

While such a fine-control device is generally satisfactory, it nevertheless has the disadvantage that the motions of the shafts are not entirely independent, since the spectral shift shaft is subject to the motions of the control shaft. The spectral shift clusters are consequently partly inserted even when insertion is not desirable.

French Pat. No. 2,168,564 discloses fuel assemblies associated with guide/tubes along which a plurality of cluster control shafts slide individually. The rods of these clusters are distributed with a rotational symmetry in relation to the rod distribution pattern in the fuel assembly. While such a device provides complete uncoupling in guidance and movement of the various control shafts, as well as a uniform distribution of the rods in the fuel assembly, it has the disadvantage of being very bulky due in particular to the requirement for control and guidance means situated inside and outside the vessel and associated with each of the control shafts. For a description of hydraulic and electromechanical drive means for such shafts, reference may be had to French Pat. No. 2,232,820.

SUMMARY OF THE INVENTION

It is an object of the invention to overcome the above-mentioned disadvantage, and it is a more specific object to provide a device for fine control of the core of a nuclear reactor by means of clusters with diverse functions, which device is of reduced bulk and in which the shafts for controlling the clusters and the associated guiding means are completely independent of each other.

For that purpose, a device for fine control of the core of a nuclear reactor having a vessel containing pressurized fluid (typically pressurized water) and a core immersed in the fluid and incorporating a plurality of vertically arranged fuel assemblies comprises a first set of clusters arranged to be guided and inserted more or less deeply into some of said fuel assemblies and a second set of clusters arranged to be guided and inserted completely into some of said fuel assemblies during part only of the core operating cycle. Each of the clusters consists of a group of rods arranged parallel to each other, arranged for being movable vertically along the assemblies and inside a guide structure for guiding the rods. Each cluster has an upper carrier movable inside and along a guide tube positioned inside the guide structure. The carrier is fast with a vertically movable drive shaft. Means for moving the shafts controlling the clusters of the first set may be conventional and comprise electromagnetic coils and pawls.

The means for moving the drive shafts of the clusters of the second set are hydraulic. Such drive shafts each move in a fluid-tight enclosure communicating with the vessel and which may be partially depressurized at the upper end thereof. Means are provided for individually locking the shafts driving the clusters of the second set in a higher position and for unlocking them.

According to one aspect of the invention, one fuel assembly out of every two is associated with two unsymmetrical clusters, namely a cluster of the first set and a cluster of the second set. The guide tubes of the two clusters are arranged symmetrically relative to the axis of a same guide structure associated with the fuel assembly. The means for guiding and moving the cluster carriers are independent of each other.

The guide structures associated with fuel assemblies are typically polygonal in shape.

According to a particular feature of the invention, the assembly formed by the carrier and the drive shaft of each cluster is equipped with slide blocks for guiding the said assembly inside the guide tube in which it moves.

According to another feature of the invention, the guide tubes are held in position inside the guide structure by guide plates or partitions which are perpendicular to the axis of the guide structure and equipped with at least one vertical spacer rod extending along the axis of the guide structure.

In a particular embodiment of the invention, the means for locking each drive shaft associated with a cluster of the second set in a "high" position and for unlocking the shaft comprises:

two pawls pivotably connected to a casing fixed inside the enclosure and capable of engaging in a groove in the control shaft.

a rotatable bush formed with two cams, one for opening the pawls and the other for closing the pawls, and means for rotating the rotatable bush responsive to axial movement of the drive shaft.

Preferably, the means for turning the rotatable bush when the control shaft moves axially comprises a thimble movable axially, equipped with two studs cooperating with inclined abutting surfaces on the rotatable bush and a shoulder which a chamfer of the control shaft abuts when the latter moves upwards.

BRIEF DESCRIPTION OF THE DRAWINGS

A description will now be given by way of example, with reference to the accompanying drawings, of an embodiment of a control device according to the invention, in which the clusters with diverse functions are fine control clusters and spectral shift clusters.

DETAILED DESCRIPTION OF A PREFERRED EMBODIMENT

Figure 1:
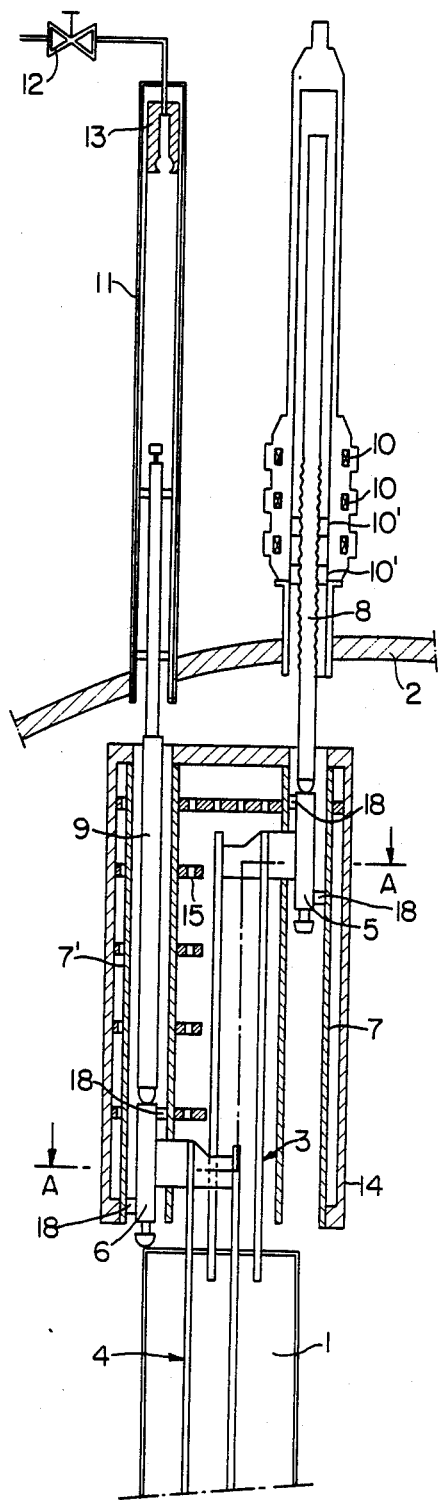
FIG. 1 is an axial section of a fuel assembly with which are associated two clusters, namely, a control cluster and a spectral shift cluster, axially movable inside a same guidance structure, according to the invention.

Referring to FIG. 1, there is shown a fuel assembly in the vessel 2 of a pressurized water nuclear reactor. Fuel assembly 1 is associated with two movable clusters 3 and 4, cluster 3 being a control cluster having neutron absorbing rods and cluster 4 being a spectral shift cluster, of fertile material for example. The rods of clusters 3 and 4 are fixed to respective carriers 5 and 6. The carriers 5 and 6 are housed in respective split guide tubes 7 and 7' and are rectilinearly movable along the axes of the guide tubes. Each carrier 5 or 6 is securely connected to the end of a drive shaft 8 or 9, respectively. The drive shaft 8 is provided with conventional driving means having electromagnetic coils 10 and pawls 10' which may be similar to those described in European Patent Application No. 111,435 and will therefore not be described in detail.

The drive shaft 9 is movable inside and along a water tight enclosure or envelope 11 communicating with the vessel 2 at its lower end. Upward movement of shaft 9 may be caused by an upward hydraulic force produced by partially depressurizing the upper part of enclosure 11 by opening a solenoid valve 12; downward gravity movement of the shaft occurs when valve 12 is closed again. Means for catching and locking the upper end of the drive shaft 9 are provided at 13 and will be described in greater detail with reference to FIGS. 4 to 12.

Figure 3:
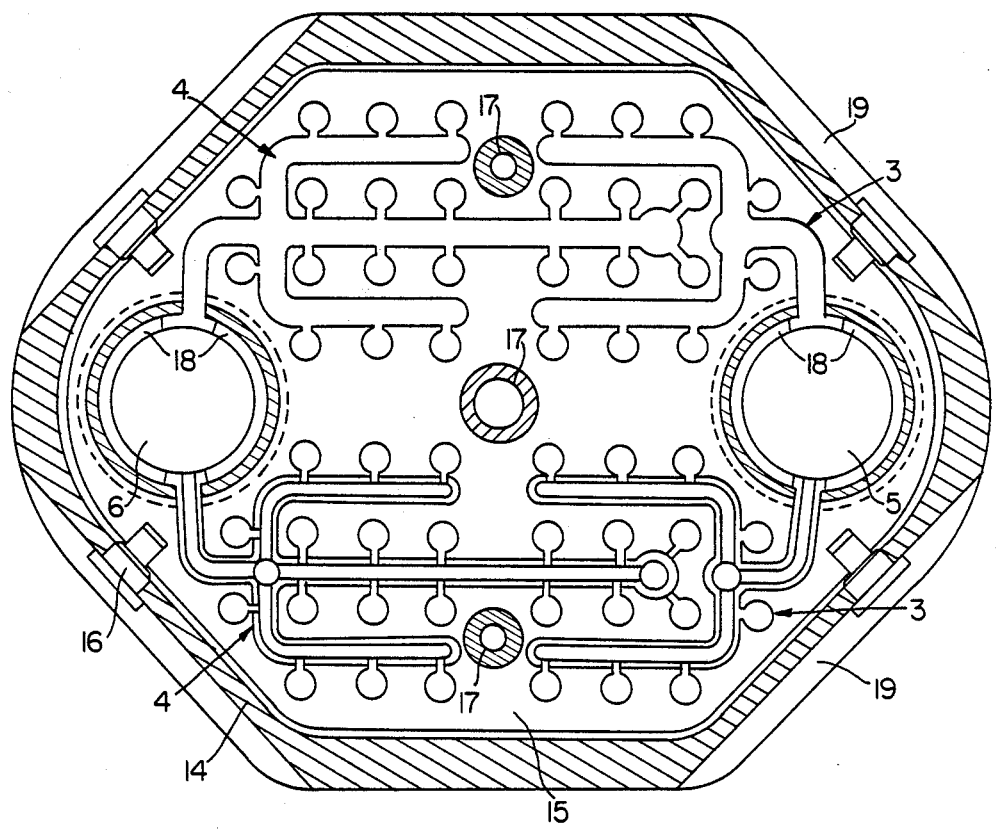
FIG. 3 is a section along the line A—A of FIG. 1, on an enlarged scale.

The guide tubes 7 and 7' are positioned inside a structure 14 located above the fuel assembly 1 and are held in place by guide plates 15 perpendicular to the axis of the guide structure 14 and located at several levels inside the latter. Referring to FIG. 3, the guide plates 15 are held by studs 16 and a peripheral clearance exists between the plates 15 and an outer casing of the guide structure 14. In the central part of the guide structure 14, three reinforcing tie bars 17 maintain the spacing of the guide plates 15.

Referring again to FIG. 1, the carriers 5 and 6 are equipped with pairs of slide blocks 18 which take the forces due to overhang and restrict accidental movements and distortions of the rods of clusters 3 and 4, thereby avoiding wear of the latter due to rubbing contact with the guide plates 15.

Figure 2:
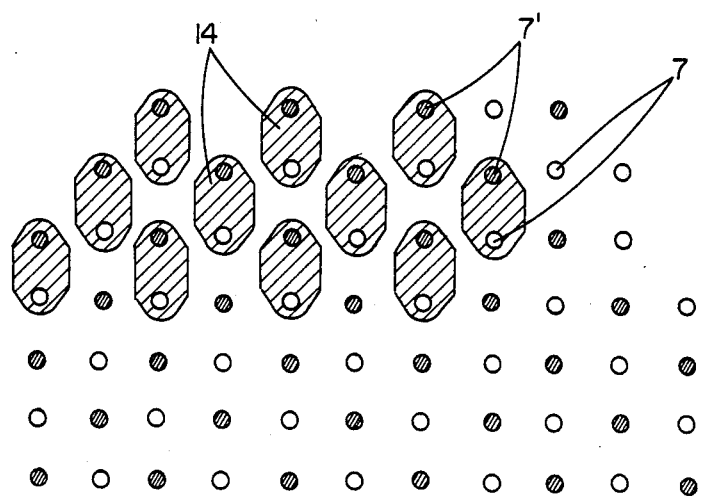
FIG. 2 is a radial cross-section of a core of a nuclear reactor at the level of the structure for guiding the clusters, one assembly out of two being of the type shown in FIG. 1.

Referring to FIG. 2, the fuel assembly lattice of a reactor core is illustrated having one fuel assembly out of two provided with a pair of clusters. The guide structures 14 associated with the fuel assemblies 1 are hexagonal in shape. The hatched circles indicate the guide tubes 7' of spectral shift clusters 4 and the unhatched circles indicate the guide tubes 7 of control clusters 3. The core assemblies inserted between those assemblies 1 which are associated with the guide structures 14 of hexagonal shape receive neither absorbing rods nor fertile rods but clusters of plugs (not shown) closing the guide tubes in the assembly for avoiding bypass of the core through the fuel assemblies devoid of clusters.

Referring to FIG. 3 again, the carriers 5 and 6 of clusters 3 and 4 are shown in guide structure 14. Four of the walls or facets 19 of the casing of the guide structure 14 are thinner due to recesses in their outer surfaces. The spaces available outside the casing for coolant transfer and circulation are consequently increased. Each cluster 3 or 4 has a plane of symmetry containing the axes of the two carriers 5 and 6 but does not have rotational symmetry relative to the axis of an extension of the respective carrier 5 or 6 which is connected to the associated drive shaft. The clusters 3 and 4, together with carriers 5 and 6, are distributed throughout the space inside the guide structure 14.

Figure 4:
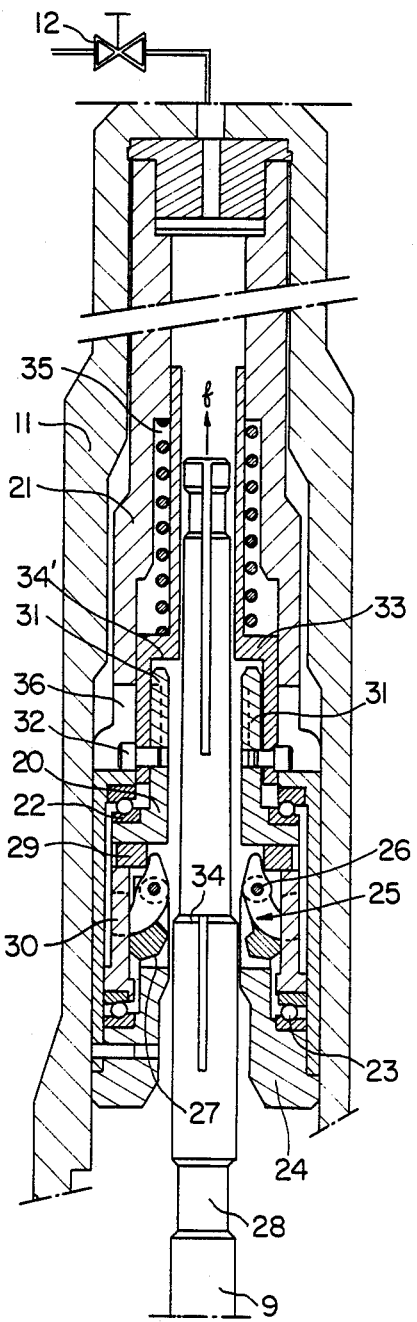
FIG. 4 is a longitudinal cross-section of means for catching and locking the drive shaft of the spectral shift cluster of FIG. 1 in a high position and for unlocking the shaft, the drive shaft being illustrated in unlocked position with the pawls inoperative.

Referring to FIG. 4, a system for catching and locking the spectral shift control shaft 9 in a high position and for unlocking this shaft is located in the upper part of the water tight enclosure 11. The system includes a hollow cylindrical bush 20 rotatably received in a casing 21 through two ball bearings 22 and 23. The casing 21 is securely connected to the enclosure 11. The lower part 24 of the casing 21 is housed inside the bush 20 and carries a pair of pawls 25, pivotably connected on an axis 26 fixed to the lower part 24. An offset lower finger 27 of each pawl 25 is dimensioned for engagement into a circular groove 28 of the drive shaft 9.

Two annular cams 29 and 30 carried by the bush are shaped for rocking the pawls 25 around their axes 26 responsive to rotation of the hollow bush 20 around its axis.

Means for rotating bush 20 comprises a set of upper inclined surfaces 31 (FIG. 12); the inclined surfaces 31 co-operate with studs 32 secured to a thimble 33, axially slidable along the axis of the water-tight enclosure 11 by the drive shaft 9 when the latter rises upon opening of the solenoid valve 12. The drive shaft 9 is formed with a chamfered shoulder 34 sized to abut thimble 33 and to force the latter upwards when it is subjected to the upward hydraulic force produced by depressurization of the upper portion of enclosure 11. The thimble 33 is biased downwardly by a spring 35 which exerts a shock-absorbing force on the thimble 33, in the direction opposite to that exerted by the drive shaft 9. The inclined surfaces 31 machined in the rotatable bush are such that axial movement of the studs 32 in either direction with respect to the bush causes rotation of the bush 20 and, consequently, of the annular cams 29 and 30. Openings 36 formed in the fixed casing 21 permit longitudinal movement of the studs 32 while preventing their rotation about the shaft axis.

Figure 5:
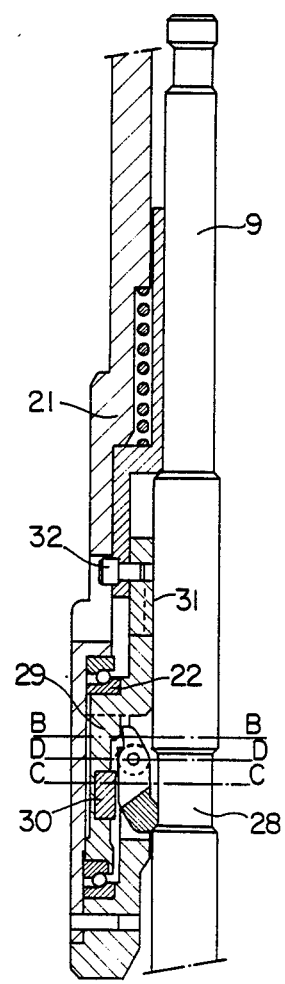
FIG. 5 is similar to FIG. 4, in which the pawls are closed but the shaft is not completely locked.

Referring to FIG. 4, the drive shaft 9 is illustrated in an intermediate position while it is lifted by the upward force f due to opening of the solenoid valve 12. The groove 28 is still below the level of pawls 25. The latter are open and permit the drive shaft 9 to move freely. The bush 20 remains in its rest position since the studs 32 are stationary. When the chamfered shoulder 34 abuts thimble 33 and starts raising the thimble and the studs 32, the latter move along part 37 (FIG. 12) of the inclined surfaces or ramps 31 and the bush 20 begins to rotate. When the studs 32 have run along the whole length of the part 37, the locking means is as shown in FIG. 5. The pawls 25 have been closed by cam 30 and the finger 27 have lodged in the circular groove 28 formed in the drive shaft 9.

Figure 8:
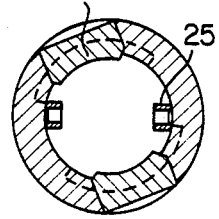
FIG. 8 is a cross-section along line, B—B of FIG. 5 in the region of the upper (pawl opening) cam of the rotatable bush.
Figure 9:
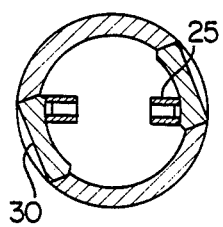
FIG. 9 is a cross-section along line, C—C of FIG. 5 in the region of the lower (pawl closing) cam.
Figure 11:
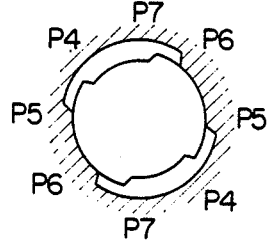
FIG. 11 shows diagrammatically the upper cam profile and the lower cam profile, superimposed.
Figure 10:
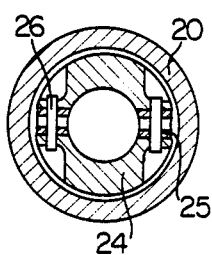
FIG. 10 is a section along line, D—D of FIG. 5 made in the region of the pawl axes.

Reference can be made to FIGS. 8, 9, 10, and 11 for a more complete understanding of operation of cams 29 and 30 to open or close the pawls 25. FIG. 8 is a section along B—B of FIG. 5 and illustrates the profile of the upper cam 29, while FIG. 9, which is a section along C—C of FIG. 5, shows the profile of the lower cam 30. In FIG. 11, the profiles of both cams are superimposed, making it possible to understand which cam acts on the pawls 25 upon each rotational movement of the rotatable bush 20. FIG. 10 is a section along D—D of FIG. 5 and shows the pawls 25 and their axes 26 in casing 21.

Figure 6:
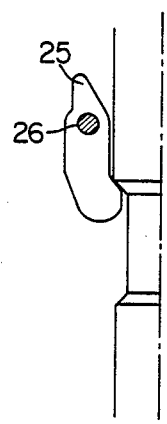
FIG. 6 shows the pawls and the drive shaft of FIG. 5 with the drive shaft completely locked.

When the drive shaft 9 is in the position illustrated in FIG. 5, the solenoid valve 12 is turned off. Then the shaft 9 moves down slowly, since the fall of shaft 9 requires that pressurized water flows along a restricted flow path consisting of the narrow clearance between shaft 9 and enclosure 11. The drive shaft 9 is stopped when its location with respect to the axes 26 of the pawls 25 is as shown in FIG. 6; it is then locked in a "high" position. The movement of the studs 32 between the locations of FIGS. 5 and 6 occurs along ramp 38 and ends when the slides are at the level identified as P6 in FIG. 12. The shaft is then locked (the levels shown respectively as P4, P5 and P7 in FIG. 12 correspond to the positions in FIGS. 4, 5 and 7).

Figure 7:
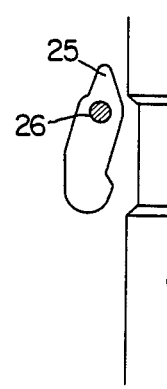
FIG. 7 shows the pawls and the shaft of FIG. 5, with the pawls open, but before initiation of the downward travel of the drive shaft into the fuel assembly with which it is associated.

When it is desired to move down the cluster 4 for inserting it into fuel assembly 1, in order to shift the neutron spectrum during the first part of the operating cycle, for example, the solenoid valve 12 is temporarily opened again. The drive shaft 9 is forced up by the upward force produced by partial depressurization in the enclosure 11. The chamfered shoulder of drive shaft 9 again abuts thimble 33. The stud 32 again moves along the ramp 39 and rotates the rotatable bush 20. The cam 29 comes to bear on the upper part of the pawls 25 which finally is in an open position as shown in FIG. 7.

Figure 12:
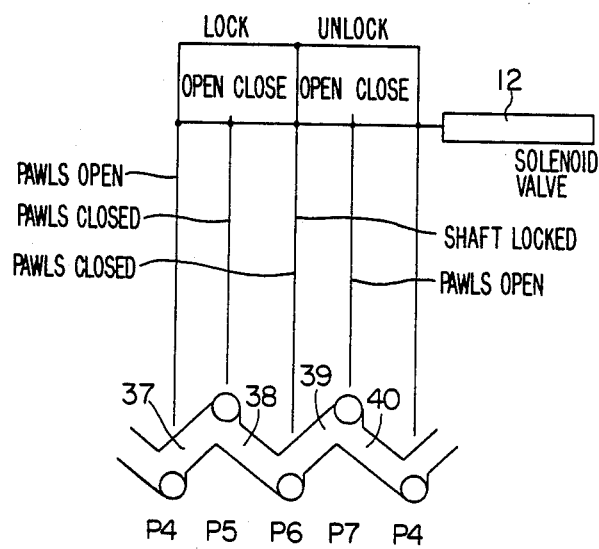
FIG. 12 is a planar projection of the inclined surfaces formed in the rotatable bush of FIG. 5.

In FIG. 12, the studs 32 are in the region shown as P7. The solenoid valve 12 is then closed in order to cause fall of the drive shaft 9. The device is once again in the position of FIG. 4, the studs 32 having moved along ramp 40.

References P4, P5, P6 and P7, correspnding to those shown in FIG. 12, have been entered in Figure 11. The position of the cams 29 and 30 relative to the pawls 25 in each position to which reference is made in FIG. 12 can thus be seen.

The control device of the invention makes it possible to insert completely the spectral shift clusters 4 during part of the core operating cycle, and to keep cluster 4 locked in a "high" position during the balance of the operating cycle, while the control clusters 3 can be inserted at any depth into the core. The motions of clusters 3 and 4 are completely mutually independent of each other. For instance, the cluster 3 may be inserted slightly into the assembly 1 without inserting the rods of cluster 4 at all into the fuel assembly 1.

The control device according to the invention is not bulky since it has only two drive shafts 8 and 9 only. All the spectral shift rods forming the cluster 4 are handled by a single drive device (9, 13) and all control rods forming the cluster 3 also are moved by a single control device (8, 10, 10'). The locations of the control devices on the cover of vessel 2 form a uniform polygonal network which is compatible with the ancillary equipment required for installing, constructing and cooling the devices.

Moreover, the outer profiles of each of the guide structures 14 are such that they permit horizontal coolant transfer and exchange without excessive head loss towards radial outlets distributed over the vessel.

The invention is not restricted to the specific embodiment which has been described by way of example; numerous modifications are possible. For instance the means for catching and locking the drive shaft of the spectral shift clusters could, of course, be modified and incorporate, for example, only an axially slidable bush acting directly on the pawls. Slide blocks 18 could be carried not only by the carrier 5 or 6, but also by other parts. It could also consist of a first slide block placed on the carrier 5 or 6 and a second slide block placed on the drive shaft 8 or 9 which extends the carrier 5 or 6.

Finally, the clusters 4 of the second set could be clusters other than spectral shift clusters, for example clusters of "passive" or inert rods.

I claim:

1. In a pressurized water nuclear reactor having a pressure vessel and a core comprising a plurality of vertically arranged adjacent fuel assemblies arranged in a regular array, a control device including a plurality of clusters arranged for insertion into and removal from the core and each having a plurality of rods connected to a common carrier vertically slidable in a stationary guide structure and connectable to a drive shaft, said clusters comprising first clusters containing neutron absorbing material and each individually associated with electromagnetic actuation means for adjusting the amount of insertion of the associated one of said first clusters and comprising second clusters containing a different material and each individually associated with hydraulic actuation means independent from said electromagnetic actuation means and controllable to cause upward and downward movement of the associated one of said second clusters, means being provided for optionally locking and unlocking one of said second clusters in a fixed position fully removed from said core, a set of one first cluster and one second cluster being associated with some only of said fuel assemblies, with the drive shafts of the two clusters in each set being non-coaxial and being arranged symmetrically with respect to the axis of a single stationary structure located above the associated fuel assembly and arranged for authorizing mutually independent vertical movement of the first and second clusters, said guide structure including two vertical guide tubes located symmetrically with respect to and at a distance from a vertical axis of the associated fuel assembly, each constructed to guide the carrier of one of the first cluster and second cluster associated with the fuel assembly.

2. A nuclear reactor according to claim 1, wherein the electromagnetic actuation means and the hydraulic actuation means of the two clusters associated with a same one of said fuel assemblies are accomodated in parallel mutually independent elongated pressurized enclosures communication with said vessel at the lower end thereof.

3. In a nuclear reactor having a pressure vessel containing fluid under pressure and a core comprising a plurality of vertically arranged adjacent fuel assemblies immersed in the fluid contained in said vessel, a control device having a first set of clusters arranged to be guided and inserted more or less deeply into some of said fuel assemblies and a second set of clusters arranged to be inserted completely into some of said fuel assemblies during part only of the core cycle, each of said clusters comprising a bundle of rods arranged parallel to each other, vertically movable inside a guide structure, fixed to a carrier slidable along and inside a guide tube positioned within the guide structure and extended by a vertically movable drive shaft, wherein means for moving the drive shafts of the clusters of the first set are electromagnetic and wherein means for moving the drive shafts of the clusters of the second set are hydraulic, each of said drive shafts of the clusters of the second set being movable along a fluid-tight elongated enclosure communicating with the vessel and provided with depressurization means, and wherein means are provided for locking the drive shafts of the clusters of the second set onto the associated enclosure in a fully removed position and for unlocking it, said device having, for one fuel assembly out of two, one cluster of the first set and one cluster of the second set whose guide tubes are non coaxial and arranged symmetrically relative to the axis of a single guide structure associated with the fuel assembly, the means for guiding and moving the two clusters beign wholly independent of each other, while the others of said fuel assemblies are devoid of associated clusters.

4. A control device as claimed in claim 3, wherein the means for locking the drive shaft of each of the clusters of the second set in a high position and for unlocking said drive shaft consists of:

two pawls whose axes are fixed to a casing fixed inside said enclosure and which are capable of engaging in a groove formed in the drive shaft,
a rotatable bush fitted with two cams one of which is capable of opening the pawls and the other is capable of closing the pawls, and
means for turning the rotatable bush when the drive shaft moves axially.

5. A control device as claimed in claim 4, wherein the means for turning the rotatable bush when the drive shaft moves axially comprises a thimble movable longitudinally, carrying studs co-operating with inclined surfaces machined in the rotatable bush and which is provided with a shoulder which a chamfered shoulder of the drive shaft abuts when the latter moves upwards.

6. In a nuclear reactor having a pressure vessel containing fluid under pressure and a core comprising a plurality of vertically arranged adjacent fuel assemblies immersed in the fluid contained in said vessel, a control device having a first set of clusters arranged to be guided and inserted more or less deeply into some of said fuel assemblies and a second set of clusters arranged to be inserted completely into said fuel assemblies during part only of the core cycle, each of said clusters comprising a bundle of rods arranged parallel to each other, vertically movable inside a guide structure, fixed to a carrier slidable along and inside a guide tube positioned within the guide structure and extended by a vertically movable drive shaft, wherein means for moving the drive shafts of the clusters of the first set are electromagnetic and wherein means for moving the drive shafts of the clusters of the second set are hydraulic,
each of said drive shafts of the clusters of the second set being movable along a fluid-tight elongated enclosure communicating with the vessel and provided with depressurization means,
and wherein means are provided for locking the drive shafts of the clusters of the second set onto the associated enclosure in a fully removed position and for unlocking it,
said device having, for one fuel assembly out of two, one cluster of the first set and one cluster of the second set whose guide tubes are non coaxial and arranged symmetrically relative to the axis of a single guide structure associated with the fuel assembly, the means for guiding and moving the two clusters being wholly independent of each other, while the others of said fuel assemblies are devoid of associated clusters, and
each carrier and the associated drive shaft of each of said clusters constituting a unit provided with at least one pair of slide blocks for guiding said unit inside and along the guide tube in which it moves.

7. A control device as claimed in claim 6, wherein the guide structure associated with the fuel assemblies are polygonal in shape.

8. A control device as claimed in claim 6, wherein the guide tubes are held in position inside the guide structure by guide plates which are perpendicular to the axis of the guide structure and provided with at least one vertical tie rod extending along the axis of the guide structure.

* * * * *